(12) United States Patent
Rothe

(10) Patent No.: US 7,669,501 B2
(45) Date of Patent: Mar. 2, 2010

(54) CONTRIVANCE FOR AUTOMATIC ROPE LENGTH CORRECTION

(75) Inventor: Hendrik Rothe, Mombris-Daxberg (DE)

(73) Assignee: Magna Closures Inc., Newmarket, Ontario (CA)

( * ) Notice: Subject to any disclaimer, the term of this patent is extended or adjusted under 35 U.S.C. 154(b) by 807 days.

(21) Appl. No.: 11/311,511

(22) Filed: Dec. 19, 2005

(65) Prior Publication Data

US 2006/0179965 A1 Aug. 17, 2006

(51) Int. Cl.
*F16C 1/22* (2006.01)
*F16D 65/38* (2006.01)
*F16D 65/56* (2006.01)

(52) U.S. Cl. ............. 74/501.5 R; 74/500.5; 188/196 B; 188/196 V; 188/196 R; 192/111.12

(58) Field of Classification Search ................ 74/501.5, 74/502.6, 501.5 R, 577 R, 500.5, 502.4; 474/101; 192/111 A, 70.25, 111.12; 188/196 B, 196 V, 188/196 R
See application file for complete search history.

(56) References Cited

U.S. PATENT DOCUMENTS

| 253,889 | A | * | 2/1882 | Roberts | 192/46 |
| 644,805 | A | * | 3/1900 | McGee | 74/136 |
| 1,001,277 | A | * | 8/1911 | Johnson | 123/185.4 |
| 2,597,270 | A | * | 5/1952 | Rahn et al. | 74/501.5 R |
| 3,036,350 | A | * | 5/1962 | Hunt | 403/166 |
| 4,304,322 | A | * | 12/1981 | Beccaris | 192/111.12 |
| 4,598,809 | A | * | 7/1986 | Glover et al. | 192/111.12 |
| 4,751,851 | A | * | 6/1988 | Deligny et al. | 74/501.5 R |
| 4,798,100 | A | * | 1/1989 | Baumgarten | 74/501.5 R |
| 5,746,094 | A | * | 5/1998 | Medebach et al. | 74/502.4 |

FOREIGN PATENT DOCUMENTS

DE 31 01 498 A1 9/1982

OTHER PUBLICATIONS

Meriam-Webster's Collegiate Dictionary, 10th edition, 1993, p. 442, definition of "Flap".*
English Abstract of DE 31 01 498 A1.

* cited by examiner

*Primary Examiner*—Richard W L Ridley
*Assistant Examiner*—Thomas Diaz
(74) *Attorney, Agent, or Firm*—Clark Hill PLC

(57) ABSTRACT

A device for automatically compensating the length of cables comprises a length-variable receiving element (1, 3, 4) for a section of a pulling means (5), a spring element (2) for applying a tensile force on the received pulling means (5) and a locking element (4), which is rotatable relative to a section of the receiving element (1, 3) about an axis that agrees substantially with the axis of the pulling means, wherein the relative motions of two sections of the receiving device (3, 4) intended to bring about the length variations are coupled to the rotational motion of the locking element (4) by means of mechanical devices (311, 421) with clearance and detent elements (15, 43) substantially block the rotation of the locking element (4) in a direction of rotation.

9 Claims, 6 Drawing Sheets

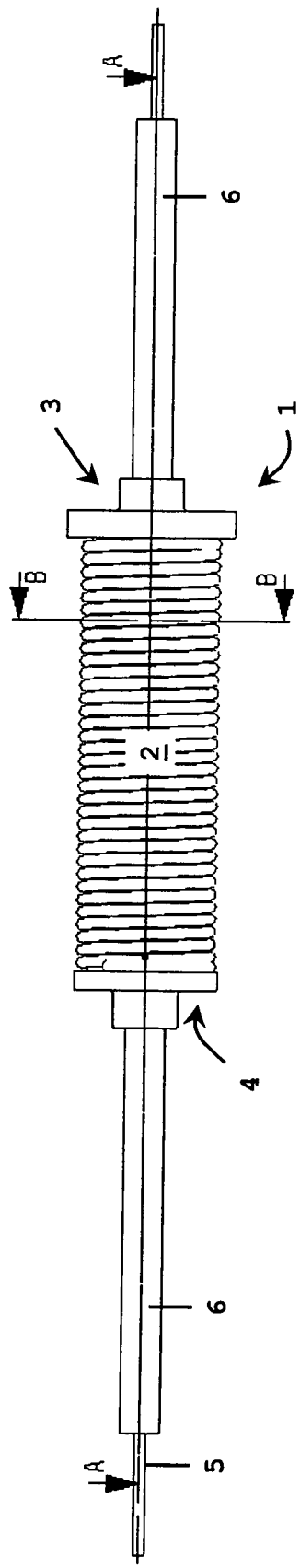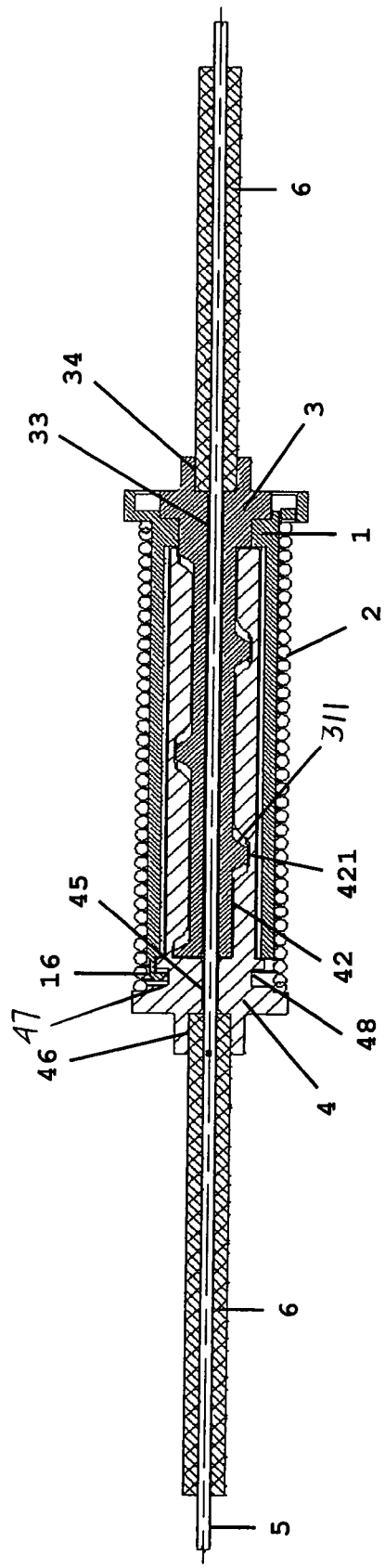

CONTRIVANCE FOR AUTOMATIC ROPE LENGTH CORRECTION

BACKGROUND OF THE INVENTION

1. Field of the Invention

The invention refers to a contrivance for automatic rope length correction for a traction rope in an operating mechanism and, in particular, to a window lifter for a motor vehicle side window.

2. Description of the Related Art

A contrivance of this type for automatic rope length correction is shown in DE 31 01 498 A1. It describes a contrivance for the extension of the flexible tube of a Bowden cable. In this well-known contrivance, an end fitting sits firmly affixed on a Bowden tube; on the side turned away from the flexible tube, the fitting is equipped with a spring-mounted tongue that has a lock catch with one slanted and one vertical flank and that is directed towards the rope. A guide bushing that is fixed in place on the side pointing away from the end fitting is pushed onto the rope. Within the section of the lock catch, the guide bushing is equipped with a corresponding tooth system that the lock catch engages with through spring action. The slanted areas on the lock catch and on the tooth system are arranged in such a way that the end fitting and the guide bushing can be pulled apart only while any movement towards each other is blocked. A pressure spring that automatically pushes the elements apart when the rope of the Bowden cable lengthens is located between the end fitting and the guide bushing. Any such lengthening is thereby automatically corrected by an automatic lengthening of the flexible tube within the contrivance.

However, with the known contrivance for automatic rope length correction there remains the problem that temperature-related lengthenings of the rope, i.e. any lengthenings due to temperature fluctuations in the rope material, are also completely compensated under certain conditions, and undesired high tensions in the traction rope result during the subsequent reversal of the lengthening.

SUMMARY OF THE INVENTION

The invention at hand addresses the problem of creating a contrivance for automatic rope length correction that corrects only those lengthenings of the traction rope that exceed the scope of a normal temperature-related lengthening.

This problem is solved by the invention at hand through a contrivance for automatic rope length correction in a rope pull drive, featuring an accommodation space of adjustable length for a section of a traction mechanism. A spring mechanism exerts traction tension on the section of the traction mechanism and a blocking element is rotatable vis-à-vis a segment of the accommodation around an axis essentially identical to the axis of the traction mechanism, with the relative motion of two segments of the accommodation space intended for length adjustments being coupled, with play, to the rotating motion of the blocking element by mechanical means. And blocking mechanisms essentially block any rotation of the blocking element in one direction of rotation.

BRIEF DESCRIPTION OF THE DRAWINGS

A preferred version of the invention at hand is described below as an example, with reference to the attached drawings, wherein:

FIG. 2 a lateral view of the contrivance for automatic rope length correction according to FIG. 1;

FIG. 3 a cross section of the contrivance for automatic rope length correction according to FIG. 1 on plane A-A as indicated in FIG. 2;

DETAILED DESCRIPTION OF THE PREFERRED EMBODIMENT

Figure 1:
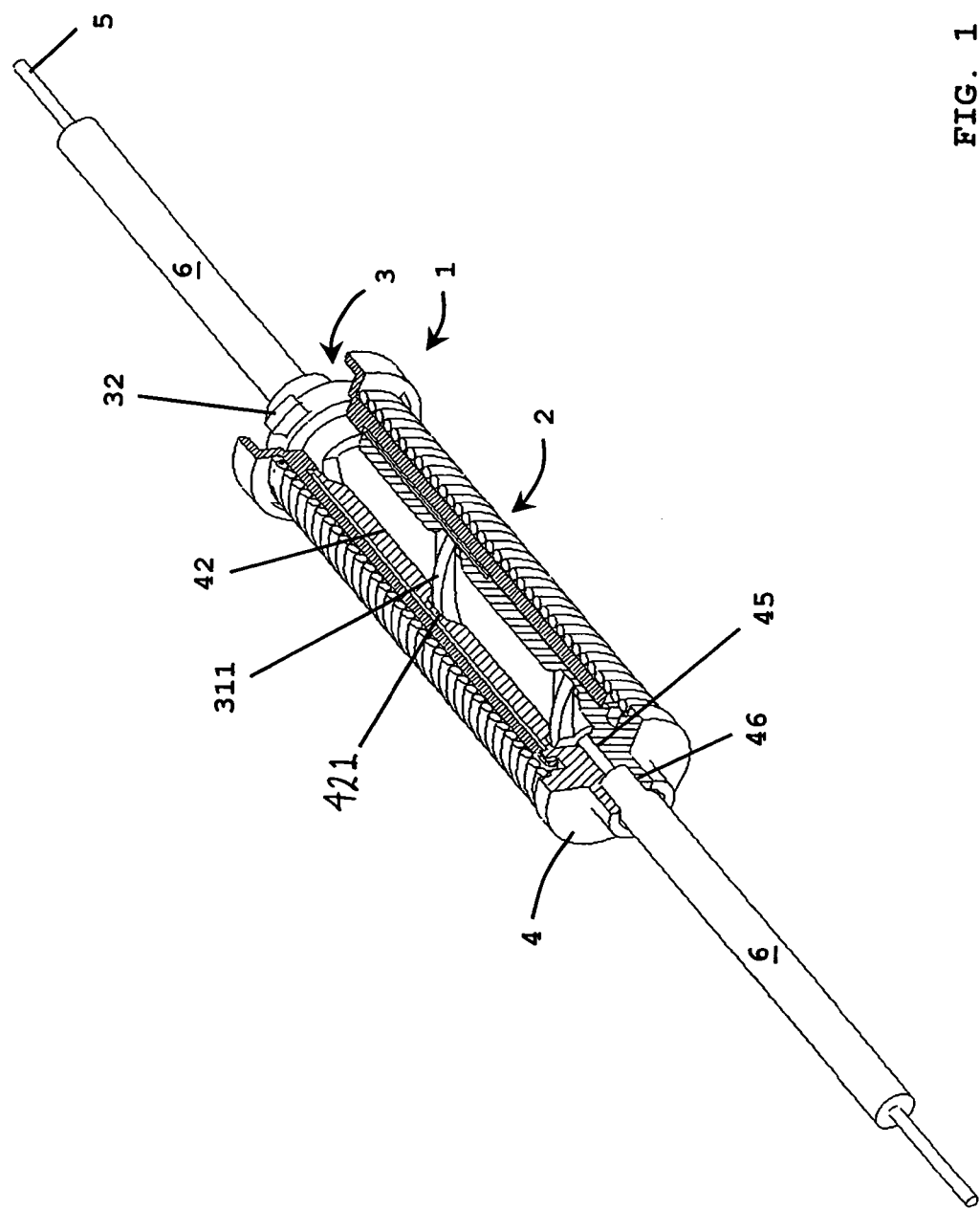
FIG. 1 a perspective partial cross section of a first preferred version of the invention at hand.
Figure 5:
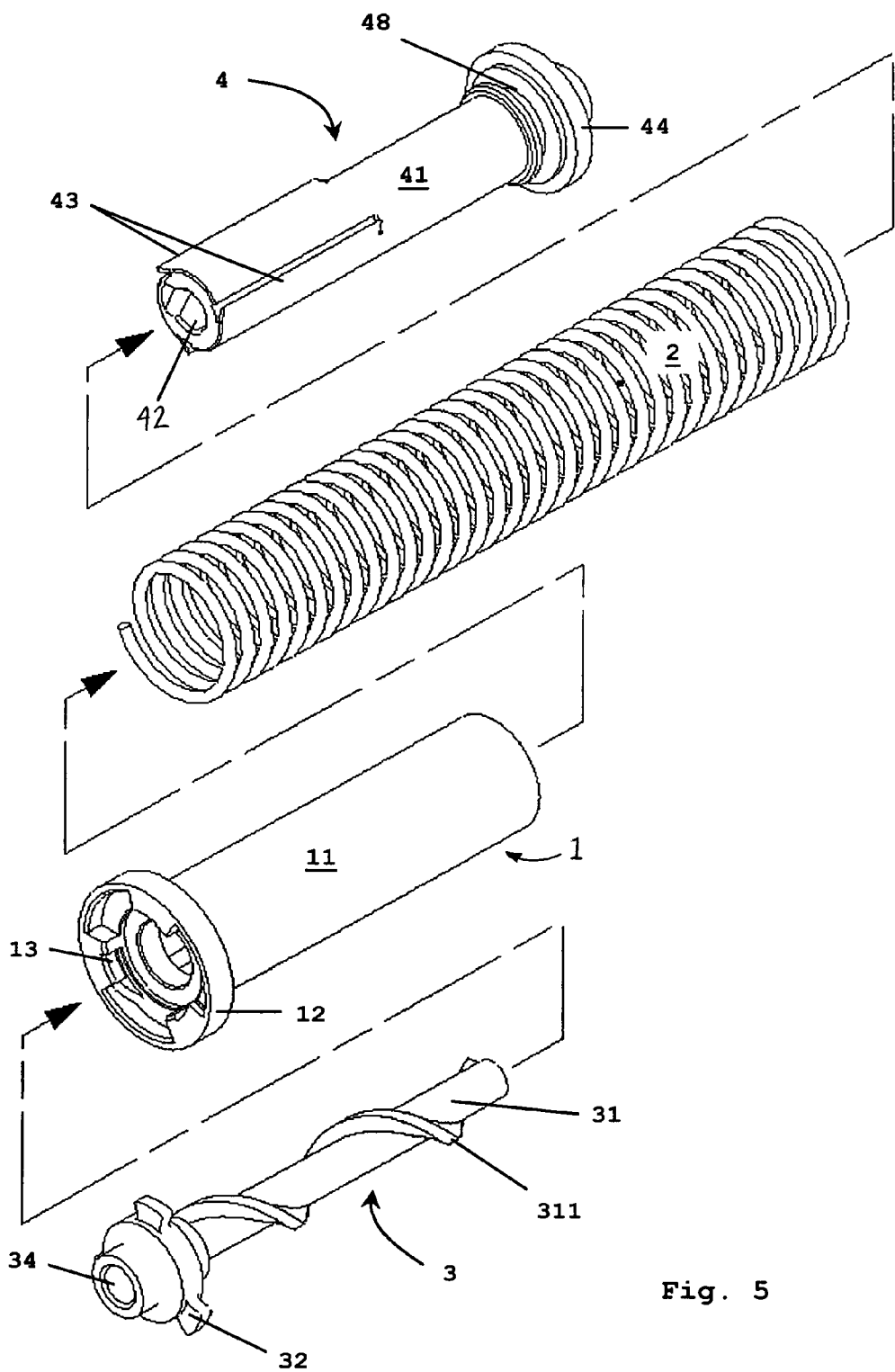
FIG. 5 a perspective explosion view of the contrivance for automatic rope length correction according to FIG. 1.
Figure 6:
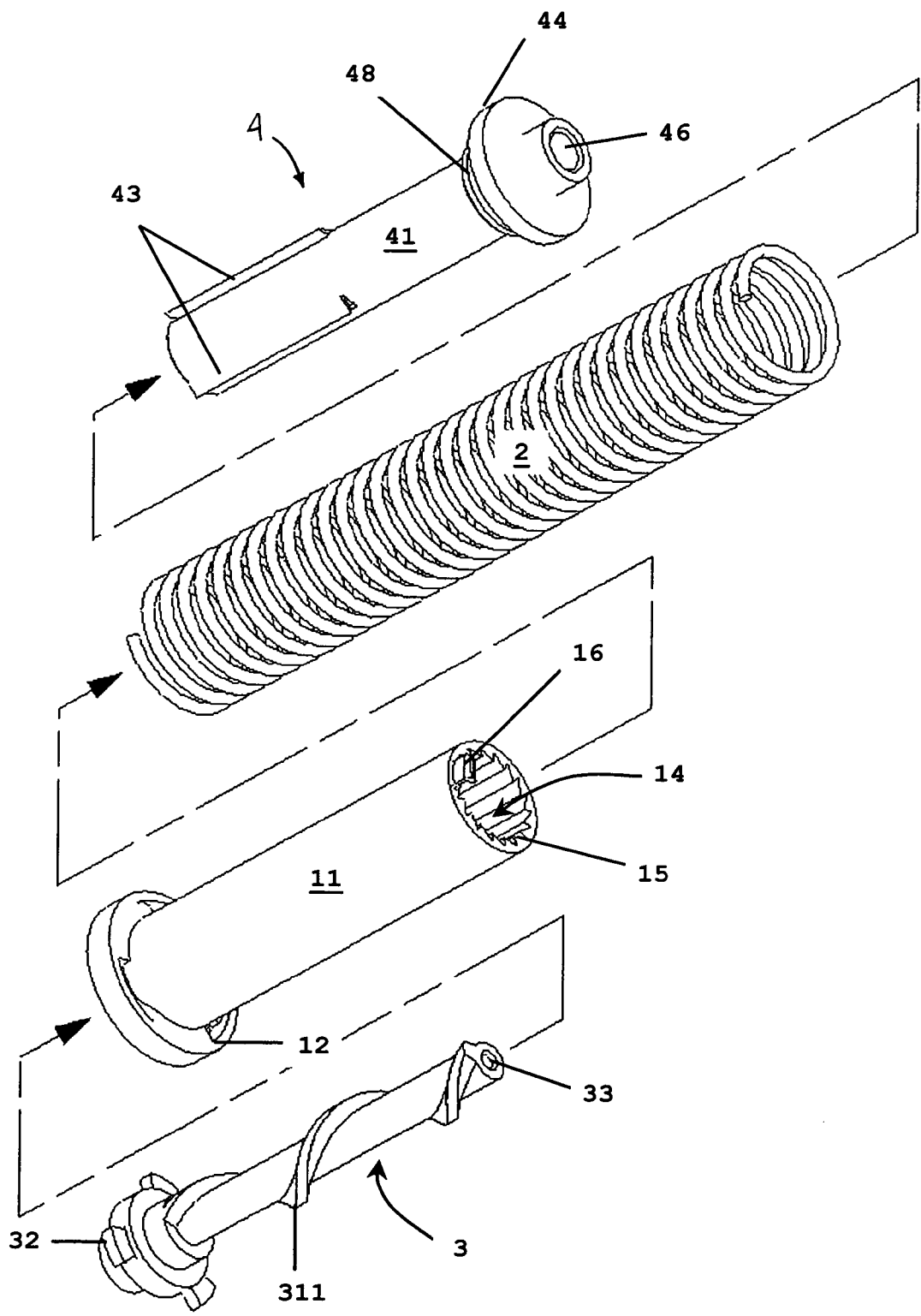
FIG. 6 an explosion view of the contrivance for automatic rope length correction according to FIG. 1 from the side.

In accordance with FIGS. 1, 5 and 6, a preferred version of a contrivance for automatic rope length correction comprises a sectional cylindrical housing 1, an essentially cylindrical helical pressure spring 2, a hollow threaded spindle 3 and a threaded bushing 4. For better understanding, FIGS. 1, 2 and 3 reflect a preferred installation situation and, accordingly, show a section of a traction rope 5 and end sections of two Bowden tubes 6 in addition to the described version.

Figure 4:
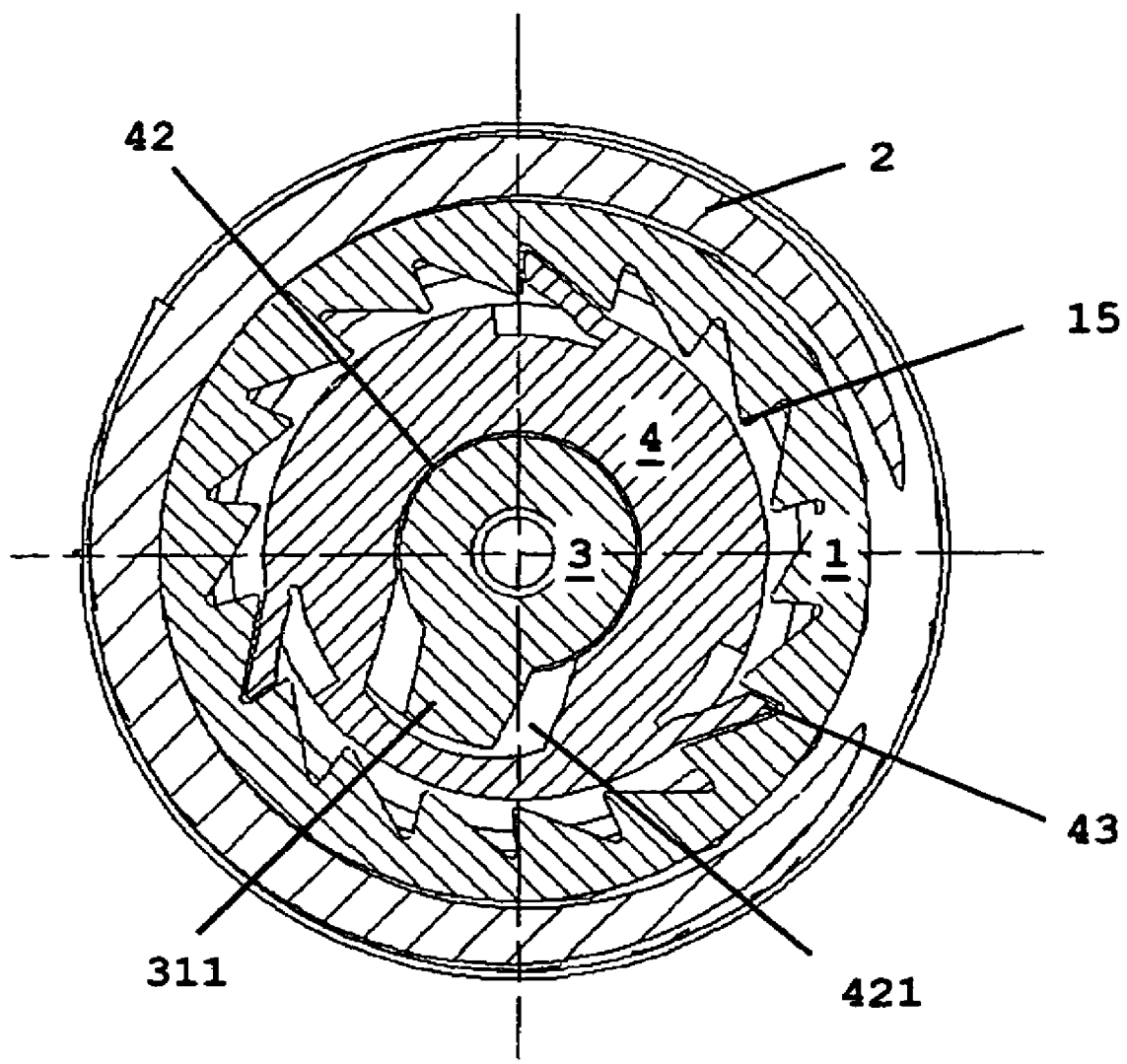
FIG. 4 a cross section through the contrivance for automatic rope length correction according to FIG. 1 on plane B-B as indicated in FIG. 2.

According to FIGS. 5 and 6, the housing 1 is provided with a tube-shaped and preferably cylindrical section 11 that is accommodated inside of the helical pressure spring 2. The helical pressure spring 2 is supported by a collar 12. The collar will be preferably located in the area of one end of the housing in order to obtain the largest possible space for the helical pressure spring above the housing 1. The means for attaching the hollow threaded spindle 3 are preferably provided at the end of the housing 1 that is adjacent to the collar 12. In the version shown, these means are designed in the manner of a part 13 of a bayonet catch. At the opposite end, the housing is equipped with a cylindrical bore 14 with an interior tooth system 15 as shown in FIGS. 4 and 6. This cylindrical bore 14 extends across a section of the axial extension of the housing 1 that corresponds to the potential range of adjustment by the special contrivance for automatic rope length correction, plus a fixed minimum breadth that will be dealt with in detail in the description with regard to the threaded bushing 4. In the version shown, the interior tooth system 15 runs parallel to the axis in the housing 1, i.e. the tooth tops of the interior tooth system 15 are running along inner mantle lines in the section of the housing 1 on view. As an alternative, a slanted tooth system could be provided as well, however with the inclination of the slanted tooth system not freely selectable but rather determined by the shape of the hollow threaded spindle 3, namely by its orientation and inclination.

In particular as shown in FIGS. 5 and 6, the hollow threaded spindle 3 is equipped in an initial section with a steep cylindrical exterior thread 31 with a threaded grooving 311 having a trapeze-shaped profile. Its pitch and shape as well as the number of gears are freely selectable within a wide range. However, for its proper functioning it must be observed that the screwed connection formed by the hollow threaded spindle 3 and the threaded bushing 4 must not be self-locking. Thus, the screwed connection must be able to convert axial forces into torque. The determining factors for the self-locking are the pitch of the thread, the thread profile as well as the static friction value of the converging slide pairing.

In a section near the end of the hollow threaded spindle 3, means are provided for its fixed connection to the housing 1. In the version shown, this is the other part 32 of the aforementioned bayonet lock.

This two-piece bayonet lock 13, 32 makes an interlocking form-fit connection between the housing 1 and the hollow threaded spindle possible 3. Preferably, the bayonet lock 13, 32 is provided with one-sided hooks that prevent a severing of the connection without special tools. A tight axial bore 33 is located in the hollow threaded spindle 3 to accommodate the traction rope 5. To support the end of the Bowden tube 6, the hollow threaded spindle 3 is provided with a short recessed axial bore 34 into which the end of the Bowden tube 6 protrudes after installation.

The threaded bushing 4 features an essentially cylindrical segment 41, particularly as shown in FIGS. 3 and 5. An axial bore 42 to accommodate the hollow threaded spindle 3 protrudes from one side and from one end into the threaded bushing 4 and initially continues in the area of the opposite end as a tight bore 45 to accommodate the traction rope 5 and then widens to the diameter to accommodate the Bowden tube 6. A nut thread 421 fitting the exterior thread 31 of the hollow threaded spindle 3 is formed in at least one front section of the bore 42. In addition, flexible flaps 43 are arranged along mantle lines in the front part of the cylindrical section. These flaps 43 collaborate in the assembled contrivance for automatic rope length correction with the internal tooth system 15 of the housing 1 in the manner shown in FIG. 4 in order to permit torsion of the two parts against each other in only one direction. The end of the threaded bushing 4 opposite the flaps 43 bears a recessed collar 44 on which the helical pressure spring 2 rests with one end following the assembly of the contrivance. As shown in FIG. 3, the tight axial bore 45 permits the rope to be tightened to go through the entire threaded bushing 4. In the version shown, the threaded bushing 4 is designed to support the end of a Bowden tube of a flexible Bowden cable, if it is used. To this end, a short recessed bore 46 into which the end of the Bowden tube protrudes when installed is arranged in front of the tight bore 45 for the traction rope.

The afore-described individual parts 1, 2, 3, 4 form the preferred version of the contrivance in accordance with the invention for automatic rope length correction following their installation as shown in FIG. 6.

The practical assembly occurs by pushing the helical pressure spring 2 over the housing 1 until it touches the collar 12. Then the threaded bushing 4 is inserted completely into the housing 1 which simultaneously compresses and pre-coils the helical pressure spring 2. Now the hollow threaded spindle 3 is entered into the nut thread 421 of the threaded bushing 4 with a twisting motion. To interlock with the bayonet lock 13, 32, it may be necessary to twist the threaded bushing 4 in the same direction as the hollow threaded spindle 3 vis-a-vis the housing 1.

The contrivance for automatic rope length correction is now under the planned spring tension and is suitable for installation into a cable pull. To that end, the traction rope is pulled through the flush borings in the hollow threaded spindle 3 and the threaded bushing 4. The ends of the Bowden tube 6 rest in the recessed bores 34, 46 and transmit the forces of the helical pressure spring 2 to the additional elements of a rope pull drive that are known per se and that are not shown.

In the event of a slackening of the traction rope 5, the pressure that the ends of the Bowden tubes exert upon the contrivance for automatic rope length correction diminishes somewhat. The spring tension will therefore press the housing 1 and the threaded bushing 4 so far apart until an equilibrium of forces has been established again. The axial movement between the housing 1 and the threaded bushing 4 is coupled with a torsion between the housing 1 and the threaded bushing 4 by way of the screwed connection between the hollow threaded spindle 3 attached to the housing 1 and the threaded bushing 4. This torsion is not blocked by the flaps 43. However, in the event of an increase of the tension forces occurring in the traction rope 5, for example, when the rope pull drive is activated, a compression of the helical pressure spring 2 is prevented because a telescoping of the threaded bushing 4 and the housing 1 would lead to a torsion of both parts towards each other due to the screwed connection which is blocked by the flaps 43. The described functional compensation of the slackening or the lengthening in the traction rope 5 is therefore irreversible.

In practice, it is frequently desirable that an irreversible compensation occurs only when the rope lengthening to be compensated exceeds a set amount. In any other event no compensation is to occur. The reason for that lies in the fact that particularly in the case of rope drives for window lifts in motor vehicles, the rope length is subject to thermal fluctuations. If a thermal lengthening of the traction rope were compensated in a completely irreversible manner, a subsequent thermal shrinking of the rope could lead to undesired high rope tension.

The described contrivance for automatic rope length correction solves this through a suitable thread play between the hollow threaded spindle 3 and the threaded bushing 4. Within this thread play, there is no coupling of the axial motions of these parts vis-à-vis each other with any rotary motion. Therefore, a blocking through the flaps 43 in their combined effect with the interior gearing does not take place.

If the contrivance for automatic rope length correction can not be installed immediately and therefore needs to be stored in a pre-cocked state for later installation, it is recommended to provide hooks, clamps or catches 16 and corresponding engagement sites such as the shown ring nut 48 at the end of the tube-shaped section 11 of the housing 1 and in the area of the recessed collar 44 of the threaded bushing 4 as shown in FIGS. 1 and 2 through which a detachable connection between the two parts can be established following the installation of the contrivance for automatic rope length correction. In the version shown, a small hook 16 arranged on the housing 1 grasps a recess 47 in the threaded bushing 4 and thereby prevents the threaded bushing 4 from being pushed out during storage by the pre-set tension of the helical pressure spring 2.

The version shown of a contrivance for automatic rope correction is suited for installation in a Bowden cable, i.e. one end of a Bowden tube can rest on either side of the contrivance for automatic rope length correction. After the installation, the rope of the Bowden cable runs continually through the bores 14, 33 and 45 of the contrivance for automatic rope length correction.

An alternative version may provide for a one-piece design of the hollow threaded spindle 3 together with the housing. However, this will make the assembly of the contrivance for automatic rope length correction somewhat more difficult because the threaded bushing 4 can not be pushed into the housing 1 or screwed onto the hollow threaded spindle 3 that is already located in it without difficulty. It is precisely such a motion that is functionally prevented by the flaps 43 in their combined effect with the interior tooth system 15 of the housing 1. Therefore, for the screwing-in of the threaded bushing 4, the flaps 43 must be pressed into corresponding recesses on the threaded bushing 4 with a suitable tool against their preset spring action. This will prevent a blocking contact of the flaps 43 with the interior tooth system 15 during the screwing-in. However, the tools must be removed after the threaded bushing 4 has been completely screwed into the housing 1 to allow the flaps 43 to come free and effect the functional torsion blocking. For the installation, the threaded bushing 4 may be wrapped in thin metal wire in coiling fashion in the area of the flaps 43 if the gap between the cylindrical section of the threaded bushing 4 and the interior wall of the housing is sufficiently dimensioned. The wire can be extricated out of the gap by its free end following the installation of the threaded bushing 4 into the housing 1.

Naturally, all of the described individual components of the contrivance for automatic rope length correction may be made of metal. Preferably, however, at least the housing 1, the hollow threaded spindle 3 and the threaded bush 4 will be made of a synthetic material. The most cost-effective option for the production of the afore-named parts from a synthetic material should be injection molding of a thermoplastic synthetic material. The helical pressure spring 2 will preferably be made of metal, in particular of steel wire. The high modulus of elasticity of steel permits it to store great tension forces in a small space. The utilization of a material with a low modulus of elasticity for the production of the helical pressure spring 2 would require relatively large dimensions of the spring that would not be desirable due to the limited installation space for the contrivance for automatic rope length correction. In the case of the afore-described design with components 1, 3, 4 made of a synthetic material together with a helical pressure spring 2 made of steel or another metal, it could turn out to be advantageous to provide a smooth, preferably hardened steel disc between the collar 12 and/or the collar 44 and the adjacent end of the helical pressure spring 2 in order to facilitate a minor torsion of these components against each other. Without such a disc, the cut end of the last coil of the helical pressure spring 2 might press into the soft plastic of the collar 12 or of the collar 44, causing the spring to be pre-cocked through twisting action along its longitudinal axis due to the functional mutual torsion between the housing 1 and the threaded bushing 4. The counterforce created thereby could be detrimental to the proper functioning of the contrivance for automatic rope length correction.

Figure 7:
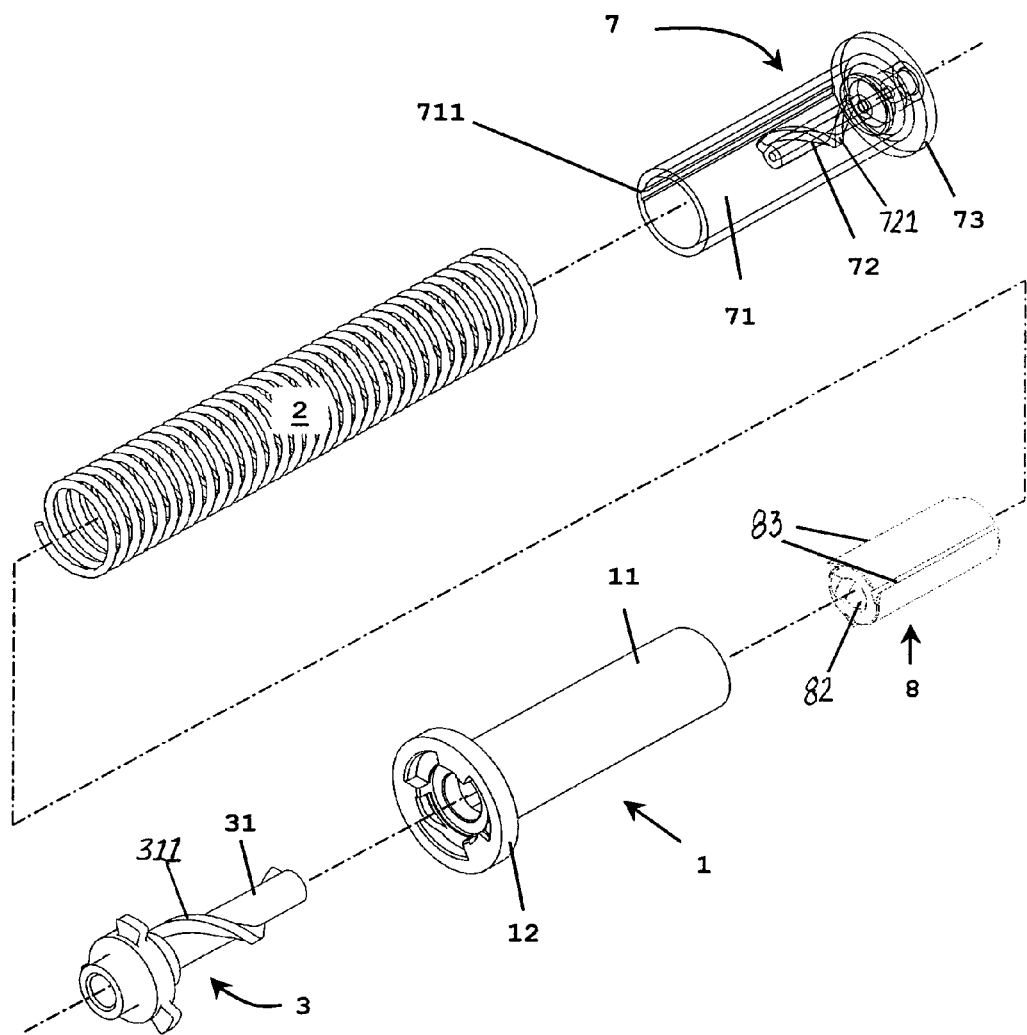
FIG. 7 an explosion view of a second preferred version of the invention at hand.

An additional preferred version of a contrivance in accordance with the invention for automatic rope length correction is shown in FIG. 7. In this version, a mutual torsion of the supporting areas of the helical pressure spring 2 and a pre-cocking of the helical pressure spring 2 through twisting action will be prevented. This is achieved through a two-piece hollow threaded spindle 31, 72. The two parts of the hollow threaded spindle 31, 72 bear threads 311, 721 in opposite directions with the same amount of pitch. The connection between the two parts of the hollow thread spindle 31, 72 is provided by a modified threaded bushing 8 in whose axial transition bore 82 two counter-oriented nut threads are provided to accommodate the corresponding end of the hollow thread spindle 31 or, respectively, 72. The modified threaded bushing 8 has an essentially cylindrical outer shape that fits into the cylindrical bore 14 of the housing 1. The housing 1 corresponds to that of the first version and, accordingly, is provided with an interior tooth system 15 as shown in particular in FIG. 6 which acts as torsion blocker in cooperation with the flaps 83 of the modified threaded bushing 8. The second part of the hollow threaded spindle 72 is designed as one piece together with a tube-shaped section 71 and a projecting bottom plate 73 that forms a bushing 7. The interior diameter of the tube-shaped section 71 is dimensioned in such a way that the tube-shaped section 11 of the housing 1 can move in it in a sliding motion with only minor play.

Preferably, any torsion of the two elements 1, 7 against each other is prevented by a longitudinal arrangement 711 of the type of a groove-ridge combination. The interior diameter of the helical pressure spring 2 accommodates the exterior diameter of the tube-shaped section 71. The assembly of the second version of a contrivance for automatic rope length correction occurs as shown in the drawing. The modified threaded bushing 8, for example, is first screwed onto the second part of the hollow threaded spindle 72 with the entire part of the interior thread available. Thereafter, the spring 2 is pushed over the tube-shaped section 71 of the bushing 7. The cylindrical part 11 of the housing 1 is subsequently pushed into the tube-shaped section 71 of the bushing 7. Finally, the first part of the hollow threaded spindle 3 is screwed into the modified threaded bushing 8 in the same manner as in the first version, and locked at the housing 1 with a bayonet lock or the like.

This prevents a potential coupling of the torsion of the modified threaded bushing 8 with the tension of the helical pressure spring 2.

The suitability of the described contrivance for automatic rope length correction is not limited to the installation location at an interruption of a Bowden tube. Modifications to the design of the described version of a contrivance for automatic rope length correction particularly in the area of one end or of both ends would, for example, permit its installation adjacent to the housing of the rope pull drive or to a catch of a window lifter.

What is claimed is:

1. A contrivance for automatic rope length correction of a traction mechanism (5) in a rope pull drive, said contrivance comprising:

a housing (1) including a tooth system (15);

a threaded bushing (4) coupled to said housing (1) allowing axial movement between said threaded bushing (4) and said housing (1) and rotational movement between said threaded bushing (4) and said housing (1) in a first direction, said threaded bushing (4) including flexible flaps (43) and a nut thread (421), said flexible flaps (43) engaging said tooth system (15) of said housing (1) to block any rotational movement between said threaded bushing (4) and said housing (1) in a second direction;

a threaded spindle (3) adapted to be fixed to said housing (1), said threaded spindle (3) having threads (311) threadably coupled with said nut thread (421) of said threaded bushing (4); and a spring mechanism (2) extending between and directly engaging said housing (1) and said threaded bushing (4), said spring mechanism (2) urging said housing (1) and said threaded bushing (4) axially in opposite directions;

wherein axial movement of said housing (1) away from said threaded bushing (4) is coupled with rotational movement of said threaded spindle (3) and therefore rotational movement of said housing (1) in said first direction relative to said threaded bushing (4) thereby lengthening said contrivance, and wherein axial movement of said housing (1) toward said threaded bushing (4) is prevented because rotational movement of said threaded spindle (3) and therefore said housing (1) in said second direction relative to said threaded bushing (4) is blocked by said flexible flaps (43) engaging said tooth system (15).

2. A contrivance for automatic rope length correction according to claim 1, wherein said threaded coupling between said threads (311) of said threaded spindle (3) and said nut thread (421) of said threaded bushing (4) includes thread play such that within said thread play there is no coupling of rotational movement and axial movement.

3. A contrivance for automatic rope length correction according to claim 1, wherein said spring mechanism (2) is a helical pressure spring.

4. A contrivance for automatic rope length correction according to claim 1, wherein said housing (1) includes a generally tube-shaped section (11) having said tooth system (15) on an interior thereof and said threaded bushing (4) includes a generally cylindrical segment (41) having said flexible flaps (43) on an exterior thereof.

5. A contrivance for automatic rope length correction according to claim 1, wherein said generally cylindrical segment (41) of said threaded bushing (4) includes said nut thread (431) on an interior thereof.

6. A contrivance for automatic rope length correction of a traction mechanism (5) in a rope pull drive, said contrivance comprising:
   a housing (1) including a tooth system (15);
   a first threaded spindle (3) adapted to be fixed to said housing (1), said first threaded spindle (3) having threads (311);
   a bushing (7) including a second threaded spindle (72) having threads (721) running in a direction opposite to said threads (311) on said first threaded spindle (3);
   a threaded bushing (8) including flexible flaps (83) and an axial bore (82), said axial bore (82) having counter-oriented nut threads for threadably receiving said threads (311) on said first threaded spindle (3) and said threads (721) on said second threaded spindle (72) to allow rotational movement of said threaded bushing (8) in a first direction, and said flexible flaps (83) engaging said tooth system (15) of said housing (1) to block any rotational movement of said threaded bushing (8) in a second direction; and
   a spring mechanism (2) extending between and engaging said housing (1) and said bushing (7), said spring mechanism (2) urging said housing (1) and said bushing (7) axially in opposite directions;
   wherein axial movement of said housing (1) away from said bushing (7) is coupled with rotational movement of said threaded bushing (8) in said first direction thereby lengthening said contrivance, and wherein axial movement of said housing (1) toward said bushing (7) is prevented because rotational movement of said threaded bushing (8) in said second direction is blocked by said flexible flaps (83) engaging said tooth system (15).

7. A contrivance for automatic rope length correction according to claim 6, wherein said housing (1) and said bushing (7) are coupled together to allow only axially sliding motion therebetween.

8. A contrivance for automatic rope length correction according to claim 7, wherein said housing (1) includes a generally tube-shaped section (11) having said tooth system (15) on an interior thereof and said threaded bushing (8) includes a generally cylindrical outer shape having said flexible flaps (83) thereon.

9. A contrivance for automatic rope length correction according to claim 8, wherein said bushing (7) includes a tube-shaped section (71) the interior of which is dimensioned to slidably receive said generally tube-shaped section (11) of said housing (1) therein.

* * * * *